Patented Jan. 11, 1938

2,104,789

UNITED STATES PATENT OFFICE 2,104,789

HALOGEN SUBSTITUTED BUTADIENES AND PROCESS FOR PREPARING THEM

Wallace Hume Carothers, Wilmington, Del., assignor to E. I. du Pont de Nemours & Company, Wilmington, Del., a corporation of Delaware No Drawing. Application March 6, 1937, Serial No. 129,470

17 Claims. (Cl. 260—162)

This invention relates to halogen-butadienes. More specifically it relates to the transformation of halogen-butadienes of the formula $$CH_2=C=CHCH_2X$$

into halogen-butadienes of the formula $$CH_2=CX'-CH=CH_2$$

where X and X' are the same or different halogen atoms.

This application is a continuation in part of application Serial No. 583,391, filed December 26, 1931, and of application Serial No. 640,326, filed October 29, 1932.

It has been shown by Carothers and Collins in U. S. Patent No. 1,950,431 that the addition of hydrogen chloride to vinylacetylene leads to chlorine-containing products. The reaction may be carried out by shaking liquid vinylacetylene with aqueous hydrogen chloride or by passing gaseous vinylacetylene into aqueous hydrogen chloride. Under properly controlled conditions one of the principal products of this reaction is the compound chloro-4-butadiene-1,2 of the formula $CH_2=C=CHCH_2Cl$. It may be readily separated by distillation from the isomeric compound chloro-2-butadiene-1,3 which is also present in the reaction product. In a similar manner bromo-4-butadiene-1,2 of the formula $CH_2=C=CHCH_2Br$ is obtained by the action of hydrogen bromide on vinylacetylene, some bromo-2-butadiene-1,3 being formed at the same time.

It is an object of this invention to bring about the chemical transformation of monohalogen butadienes. It is a further object of the invention to convert halogen-4-butadienes-1,2 to halogen-2-butadienes-1,3 in which the halogen atom may be the same or of higher atomic weight. It is a particular object of the invention to convert or isomerize chloro-4-butadiene-1,2 to chloro-2-butadiene-1,3. A still further object is the preparation of new substances, particularly iodo-2-butadiene-1,3 and its derivatives. Further objects will become apparent hereinafter.

The objects of the invention are accomplished by treating the halogen-4-butadiene-1,2 with an isomerization catalyst of one of the types given below, and isolating the resulting halogen-2-butadiene-1,3. When it is desired to obtain a halogen-2-butadiene-1,3 in which the halogen is different from that in the halogen-4-butadiene-1,2, the latter, prior to or simultaneous with its treatment with the isomerization catalyst, is treated with an ionized inorganic metallic halide in which the halogen is of higher atomic weight than the halogen in the halogen-4-butadiene-1,2. In the case of iodo-4-butadiene-1,3, the isomerization catalyst may, if desired, be omitted and the transformation to iodo-2-butadiene-1,3 effected simply by heating and distilling in the presence or absence of an ionized inorganic chloride or bromide.

The transformations taking place in the above process are as follows. In these equations X and Y are different halogen atoms, Y being of higher atomic weight, and M is a metal:

1. $CH_2=C=CH-CH_2X$ 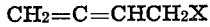 $CH_2=CX-CH=CH_2$

2. $CH_2=C=CH-CH_2X$ 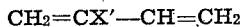 $CH_2=CY-CH=CH_2$

Reaction 2 occurs or may be carried out in two steps, as follows:

2A. $CH_2=C=CH-CH_2X$ $\xrightarrow{MY}$ $CH_2=C=CH-CH_2Y$

2B. $CH_2=C=CH-CH_2Y$ $\xrightarrow{\text{isomerization catalyst}}$ $CH_2=CY-CH=CH_2$ the second of which will be seen to be identical in type with Reaction 1.

The isomerization catalysts suitable for use in the invention include strong inorganic bases such as powdered caustic alkalies, nitrogen bases such as quinoline, and dehydration catalysts such as silica gel. With basic catalysts temperatures up to 140° C. to 150° C. are often required and with silica gel, a temperature of 275° C. to 300° C. may be needed. Although these catalysts and temperatures are useful, they often lead to the formation of considerable amounts of undesirable by-products, and in practice it has been found preferable to use less drastic conditions and more effective catalytic agents. Outstanding among such catalysts are copper, copper oxides, cuprous or cupric salts, ferric salts, and salts of noble metals such as gold and platinum. Ordinarily the reaction is preferably carried out in the presence of a hydroxylated liquid such as water or an alcohol, and it is generally favored also by the presence of some hydrohalogen acid. Where the catalyst is a salt, it is preferably a halide but may be a sulfate, nitrate or phosphate. Cuprous halides, such as cuprous chloride are particularly preferred as catalysts as well as cuprous chloride and hydrochloric acid.

The conversion of a halogen-4-butadiene-1,2 into the corresponding halogen-2-butadiene-1,3 is illustrated in the following examples which are intended to be construed as illustrative only.

Example 1

One hundred grams of chloro-4-butadiene-1,2 is added with cooling to 300 cc. of 18.5% aqueous hydrochloric acid containing 20 grams of cuprous chloride. The mixture is agitated for 4 hours at 26° C. and then steam-distilled. The non-aqueous portion of the distillate on redistillation yields 75 grams of pure chloro-2-butadiene-1,3 without a trace of the isomeric compound. The only by-product is a small amount of polymeric material.

Example 2

An aqueous suspension of 42 grams of cuprous oxide in 100 cc. of water is shaken with 100 grams of chloro-4-butadiene-1,2 for 18 hours at room temperature. Distillation then furnishes an excellent yield of chloro-2-butadiene-1,3 together with a small amount of hydroxy-4-butadiene-1,2.

Example 3

To 100 parts of chloro-4-butadiene-1,2 about 3 parts of anhydrous ferric chloride are added gradually in small portions. The mixture becomes colored and heat is evolved. Upon completion of the reaction the mixture is distilled and a good yield of chloro-2-butadiene-1,3 obtained. Some tarry material is formed.

Example 4

To 18 grams of chloro-4-butadiene-1,2 dissolved in 50 cc. of ethanol is added 3.2 grams of cuprous chloride and the mixture is allowed to stand at room temperature for 42 hours. At the end of this time practically complete conversion to chloro-2-butadiene-1,3 has taken place. The same effect is also obtained in the presence of other solvents such as acetonitrile. Other copper salts such as cupric chloride, cupric sulfate, cupric nitrate and cupric acetate may be substituted for the cuprous chloride and good results obtained though the last three are somewhat less effective. In an analogous experiment in which the catalyst was omitted, the chloro-4-butadiene-1,2 was unchanged after 42 hours.

Example 5

Ten grams of chloro-4-butadiene-1,2 in 25 cc. of ethanol containing 1.8 grams of hydrogen chloride and 1.5 grams of auric chloride is allowed to stand for 120 hours. At the end of this time about 40% of the chloro-4-butadiene-1,2 has been isomerized. Replacement of the auric chloride by 2.6 grams of chloroplatinic acid results in about 60% isomerization of the chloro-4-butadiene-1,2.

A variation of this invention is the conversion of a halogen-4-butadiene-1,2 into a halogen-2-butadiene-1,3 wherein the halogen is of higher atomic weight. This result may be accomplished by reacting the halogen-4-butadiene-1,2, before or simultaneously with its treatment with the isomerization catalyst, with an inorganic metal halide yielding a high concentration of halogen ions under the conditions used in which halide the halogen atom is of a higher atomic weight than that in the halogen-4-butadiene-1,2. The stepwise process is illustrated in the following example.

Example 6

Equimolar parts of chloro-4-butadiene-1,2 and sodium iodide are dissolved in 80% alcohol or in acetone and allowed to stand for 3 hours at room temperature. The heavy yellow oil precipitated by dilution with water is vacuum distilled. The product thus obtained is iodo-4-butadiene-1,2 boiling at about 130° C. at 760 mm. and having $d_4^{20}$ 1.713 and $N_D^{20}$ 1.570. This compound is then treated with dilute aqueous hydrochloric acid containing cuprous chloride in the manner and proportions of Example 1, and iodo-2-butadiene-1,3, a liquid boiling at 111° C. to 114° C. at 760 mm., $N_D^{20}$ 1.56, and $d_{20}^{20}$ 1.73, is obtained.

In a similar manner, bromo-2-butadiene-1,3 is obtained by reacting chloro-4-butadiene-1,2 with alcoholic sodium bromide, and then treating the resulting bromo-4-butadiene-1,2 with cuprous chloride in hydrochloric acid. The intermediate bromo-4-butadiene-1,2 is a colorless liquid boiling at 64° C. to 66° C./181 mm. and at 109° C. to 111° C./760 mm., of $d_4^{20}$ 1.426, and of $N_D^{20}$ 1.53.

The following example illustrates the simultaneous substitution and rearrangement.

Example 7

A solution prepared from 250 grams of potassium iodide, 170 cc. of water, 25 grams of cuprous chloride and 6 cc. of concentrated hydrochloric acid is shaken with 89 grams of chloro-4-butadiene-1,2 at ordinary temperatures for about 6 hours. Separation and vacuum distillation of the non-aqueous layer then furnishes as practically the only distillable product iodo-2-butadiene-1,3.

The reaction of simultaneous substitution and rearrangement illustrated in Example 7 is useful and valuable because it provides a very simple method of obtaining iodo-2-butadiene-1,3. This compound readily undergoes polymerization, and in fact shows a greater tendency to polymerize than the analogous chlorine and bromine compounds. Thus, it is usually converted to a granular rather rubber-like mass merely upon being allowed to stand for a few hours at ordinary temperatures. Products having more desirable rubber-like properties are, however, obtained by the polymerization of the iodo compound in aqueous emulsion. Iodo-4-butadiene-1,3 may also be polymerized in admixture with chloro-2-butadiene-1,3 or with the corresponding bromo compound, and in this manner products are formed which have a higher degree of plasticity than those obtained from the pure individual haloprenes. Finally, it may be said that iodo-2-butadiene-1,3 may, in general, be polymerized under any of the widely varying conditions already so completely described in the art with particular reference to chloro-2-butadiene-1,3.

Iodo-2-butadiene-1,3 is also useful for preparation of dye intermediates, for example, when heated with maleic anhydride it yields iodo-4-tetrahydro-1,2,3,6 phthalic acid, which melts at about 202° C. to 203° C. When heated with naphthaquinone iodo-2-butadiene-1,3 reacts readily giving a product which is readily oxidized by air in alkaline solution with the formation of iodo-2-anthraquinone-9,10.

In the above illustrations the isomerization of halogen-4-butadienes-1,2 is described under various conditions. It should be added, however, that the different halides show considerable difference in their ease of rearrangement. The iodo compound rearranges with especial ease and even by heating to above 100° C. in the absence of any added catalyst. This is illustrated in the following example:

*Example 8*

Iodo-4-butadiene-1,2 is heated to about 125° C. in a distilling flask. A vigorous reaction occurs with the evolution of heat, and distillation then furnishes only the rearrangement product iodo-2-butadiene-1,3.

The invention herein described affords a simple and direct method for the interconversion of halogen-4-butadienes-1,2 and for their transformation into halogen-2-butadienes-1,3. These latter products especially are of particular value for the preparation of synthetic rubbers and for the conversion to other useful products.

By way of affirming what is believed to be obvious, it is pointed out that where the class "halogen" is mentioned above, unless it is particularly qualified, the individual members, chlorine, bromine and iodine are all specifically contemplated as well as the broad class. The other members of the group may be used in place of the chloro derivative above except, of course, in the substitution step where only those of lower atomic weight than the halogen to be substituted may be used.

In general, it is also advisable to have a polymerization inhibitor present, particularly during the separation of the halogen-2-butadienes-1,3 from the reaction mass, since all these compounds polymerize quite rapidly. Alternatively, the separation may be effected under conditions which tend to prevent polymerization, such as in the absence of light, particularly direct light, as well as at low temperature. The desirability of inhibiting polymerization of chloro-2-butadiene-1,3 during its preparation is specifically disclosed in U. S. Patent No. 1,950,431, mentioned above, to which reference is made for information not given here. It will suffice to point out that among the suitable inhibitors are hydroquinone, catechol, and pyrogallol. Temperatures ranging up to 300° C. for the isomerization step are mentioned above and room temperature is indicated as suitable for the substitution step and for the simultaneous substitution and isomerization. It is possible, however, to employ temperatures varying from those mentioned in connection with the isomerization catalysts. It is likewise possible to employ temperatures varying both above and below room temperature in the substitution step, whether it be carried out separately or simultaneously with the isomerization. Preferred temperatures are indicated above for certain of the compounds and catalysts but these will, of course, vary with both the catalysts and the compounds being treated.

The time of reaction also varies with the reactants as well as with the other conditions. Particular reaction times are given in the above examples and from these suitable reaction periods under other conditions and with other reactants are obvious. Similarly, the proportions of reactants, catalysts, and amounts of solvents to be used as well as the acidity may all vary considerably from those employed in the above examples, which sufficiently indicate the nature of the proportions, however, so as to enable those skilled in the art to select others where they are desirable.

The medium in which the reaction is to be carried out need not necessarily be a solvent for all the components of the reaction mixture. Suitable media are indicated above and from these it is apparent that others which have similar properties may also be employed. It is desirable, however, to bring the various substances in the reaction mixture into intimate contact and accordingly it is preferable to agitate the mixture where any of the components are insoluble in the mixture to any substantial extent.

The invention is not limited to any particular method for separating the products of the reaction. Preferred methods are illustrated above and the desirability of preventing polymerization has already been indicated.

It is apparent that many widely different embodiments of this invention may be made without departing from the spirit and scope thereof, and, therefore, it is not intended to be limited except as indicated in the appended claims.

I claim:

1. Process which comprises treating a halogen-4-butadiene-1,2 with an isomerization catalyst and isolating the resulting halogen-2-butadiene-1,3.

2. Process which comprises treating a halogen-4-butadiene-1,2 with an isomerization catalyst from the class consisting of organic bases, inorganic bases, mineral acids, copper, copper oxides, copper salts, and noble metal salts, and isolating the resulting halogen-2-butadiene-1,3.

3. Process according to claim 2 in which the halogen-4-butadiene-1,2 is chloro-4-butadiene-1,2.

4. Process according to claim 2 in which the halogen-4-butadiene-1,2 is chloro-4-butadiene-1,2 and the catalyst is a cuprous halide.

5. Process according to claim 2 in which the isomerization is carried out in the presence of a hydroxylated liquid of the class consisting of water and alcohols.

6. Process according to claim 2 in which the isomerization is carried out in the presence of a cuprous halide, and a hydrohalogen acid, and a hydroxylated liquid of the class consisting of water and alcohols.

7. Process which comprises reacting a halogen-4-butadiene-1,2 with an ionized inorganic metallic halide in which the halogen atom is of higher atomic weight than that in the halogen-4-butadiene-1,2, treating the resulting product with an isomerization catalyst from the class consisting of organic bases, inorganic bases, mineral acids, copper, copper oxides, copper salts, and noble metal salts, and isolating the resulting halogen-2-butadiene-1,3.

8. Process according to claim 7 in which the halogen-4-butadiene-1,2 is chloro-4-butadiene-1,2.

9. Process according to claim 7 in which the halogen-4-butadiene-1,2 is bromo-4-butadiene-1,2.

10. Process which comprises reacting a halogen-4-butadiene-1,2 with an ionized inorganic metallic halide in which the halogen atom is of higher atomic weight than that in the halogen-4-butadiene-1,2, said reaction being carried out in the presence of an isomerization catalyst from the class consisting of organic bases, inorganic bases, mineral acids, copper, copper salts, copper oxides, and noble metal salts, and thereafter isolating the resulting halogen-2-butadiene-1,3.

11. Process according to claim 10 in which the halogen-4-butadiene-1,2 is chloro-4-butadiene-1,2.

12. Process according to claim 10 in which the halogen-4-butadiene-1,2 is bromo-4-butadiene-1,2.

13. Iodo-2-butadiene-1,3.

14. A polymer of iodo-2-butadiene-1,3.

15. An interpolymer of iodo-2-butadiene-1,3 and chloro-2-butadiene-1,3.

16. Process which comprises heating iodo-4-butadiene-1,2 to a temperature above 100° C. and isolating the resulting iodo-2-butadiene-1,3.

17. Process which comprises reacting a halogen-4-butadiene-1,2 with an ionized inorganic metallic halide in which the halogen atom is of higher atomic weight than that in the halogen-4-butadiene-1,2.

WALLACE HUME CAROTHERS.